US012694708B2

(12) United States Patent　　(10) Patent No.:　US 12,694,708 B2
Chaudhuri et al.　　　　　　　(45) Date of Patent:　　　Jul. 28, 2026

(54) CONTEXT-BASED SPEAKER COUNTER FOR A SPEAKER DIARIZATION SYSTEM

(71) Applicant: Google LLC, Mountain View, CA (US)

(72) Inventors: Sourish Chaudhuri, San Francisco, CA (US); Lev Finkelstein, Netanya (IL)

(73) Assignee: Google LLC, Mountain View, CA (US)

( * ) Notice: Subject to any disclaimer, the term of this patent is extended or adjusted under 35 U.S.C. 154(b) by 738 days.

(21) Appl. No.: 17/909,879

(22) PCT Filed: Mar. 13, 2020

(86) PCT No.: PCT/US2020/022723
§ 371 (c)(1),
(2) Date: Sep. 7, 2022

(87) PCT Pub. No.: WO2021/183142
PCT Pub. Date: Sep. 16, 2021

(65) Prior Publication Data
US 2023/0103060 A1　　　Mar. 30, 2023

(51) Int. Cl.
G06V 40/16　　　　(2022.01)
G06V 10/50　　　　(2022.01)
(Continued)

(52) U.S. Cl.
CPC .......... G06V 40/161 (2022.01); G06V 10/507 (2022.01); G06V 10/762 (2022.01);
(Continued)

(58) Field of Classification Search
CPC .. G06V 40/161; G06V 10/507; G06V 10/762; G06V 20/41; G06V 20/46;
(Continued)

(56) References Cited

U.S. PATENT DOCUMENTS

| 10,304,458 | B1 | 5/2019 | Woo |
| 2013/0148880 | A1 | 6/2013 | Kennedy et al. |

(Continued)

FOREIGN PATENT DOCUMENTS

| CN | 109410954 A | 3/2019 |
| CN | 110544491 A | 12/2019 |

(Continued)

OTHER PUBLICATIONS

Yina Han, Retrieval of TV Talk-Show Speakers by Associating Audio Transcript to Visual Clusters (Year: 2017).*

(Continued)

*Primary Examiner* — Andrew M Moyer
*Assistant Examiner* — Ahmed A Nasher
(74) *Attorney, Agent, or Firm* — Fish & Richardson P.C.

(57)　　　　　ABSTRACT

Methods, systems, and apparatus, including computer programs encoded on a computer storage medium, for determining the number of speakers in a video and a corresponding audio using visual context. In one aspect, a method includes detecting within the video multiple speakers, determining a bounding box for each detected speaker that includes the detected person and objects within a threshold distance of the detected person in an image frame, determining a unique descriptor for that person based in part on image information depicting the objects within the bounding box, determining a cardinality of unique speakers in the video, providing to the speaker diarization system the cardinality of unique speakers.

16 Claims, 5 Drawing Sheets

(51) Int. Cl.

| | |
|---|---|
| *G06V 10/762* | (2022.01) |
| *G06V 20/40* | (2022.01) |
| *G06V 40/10* | (2022.01) |
| *G10L 17/02* | (2013.01) |
| *G10L 21/028* | (2013.01) |
| *G10L 25/57* | (2013.01) |

(52) U.S. Cl.
CPC .............. *G06V 20/41* (2022.01); *G06V 20/46* (2022.01); *G06V 40/10* (2022.01); *G06V 40/169* (2022.01); *G06V 40/173* (2022.01); *G10L 17/02* (2013.01); *G10L 21/028* (2013.01); *G10L 25/57* (2013.01)

(58) Field of Classification Search
CPC .... G06V 40/10; G06V 40/169; G06V 40/173; G06V 10/764; G06V 20/70; G10L 17/02; G10L 21/028; G10L 25/57; G10L 21/0272; G10L 17/00; G06T 2207/30242; G06T 2210/12
See application file for complete search history.

(56) References Cited

U.S. PATENT DOCUMENTS

| | | | |
|---|---|---|---|
| 2018/0005071 A1 | 1/2018 | Drees et al. | |
| 2018/0174600 A1 | 6/2018 | Chaudhuri et al. | |
| 2019/0007623 A1* | 1/2019 | Wang ..................... | H04N 7/147 |
| 2019/0213406 A1* | 7/2019 | Porikli ................. | G06V 20/597 |
| 2019/0341050 A1* | 11/2019 | Diamant .............. | G06V 40/172 |
| 2020/0410225 A1* | 12/2020 | Goel ....................... | G08G 1/166 |
| 2021/0211825 A1* | 7/2021 | Joyner .................... | H04S 7/301 |

FOREIGN PATENT DOCUMENTS

| | | |
|---|---|---|
| CN | 110569908 A | 12/2019 |
| CN | 110709924 A | 1/2020 |
| WO | WO 2019118089 | 6/2019 |
| WO | WO 2019137137 | 7/2019 |

OTHER PUBLICATIONS

A. Li, L. Liu, K. Wang, S. Liu and S. Yan, "Clothing Attributes Assisted Person Reidentification," in IEEE Transactions on Circuits and Systems for Video Technology, vol. 25, No. 5, pp. 869-878 (Year: 2015).*

Cloud.google.com [online], "Speech to Text" Apr. 2018, retrieved on May 4, 2023, retrieved from URL <https://cloud.google.com/speech-to-text/>, 9 pages.

El Khoury et al., "Audiovisual diarization of people in video content." Multimedia tools and applications 68, Feb. 2014, 29 pages.

Gebru et al., "Audio-visual speaker diarization based on spatiotemporal bayesian fusion." Submitted on Nov. 2016, arXiv:1603.09725v2, 14 pages.

He et al., "K-histograms: An efficient clustering algorithm for categorical dataset." Submitted on Sep. 2005, arXiv:0509033, 11 pages.

Hoover et al., "Putting a Face to the Voice: Fusing Audio and Visual Signals Across a Video to Determine Speakers" Submitted on May 2017, arXiv:1706.00079, 5 pages.

International Preliminary Report on Patentability in International Appln. No. PCT/US2020/022723, mailed on Sep. 22, 2022, 12 pages.

International Search Report and Written Opinion in International Appln. No. PCT/US2020/022723, mailed on Nov. 10, 2022, 19 pages.

Han et al., "Retrieval of TV Talk-Show Speakers by Associating Audio Transcript to Visual Clusters," IEEE Access, Sep. 2017, 5:20512-20523.

Office Action in Chinese Appln. No. 2020800984837, mailed on Sep. 20, 2025, 30 pages (with machine translation).

Office Action in Chinese Appln. No. 2020800984837, mailed on Feb. 28, 2026, 23 pages (with English translation).

* cited by examiner

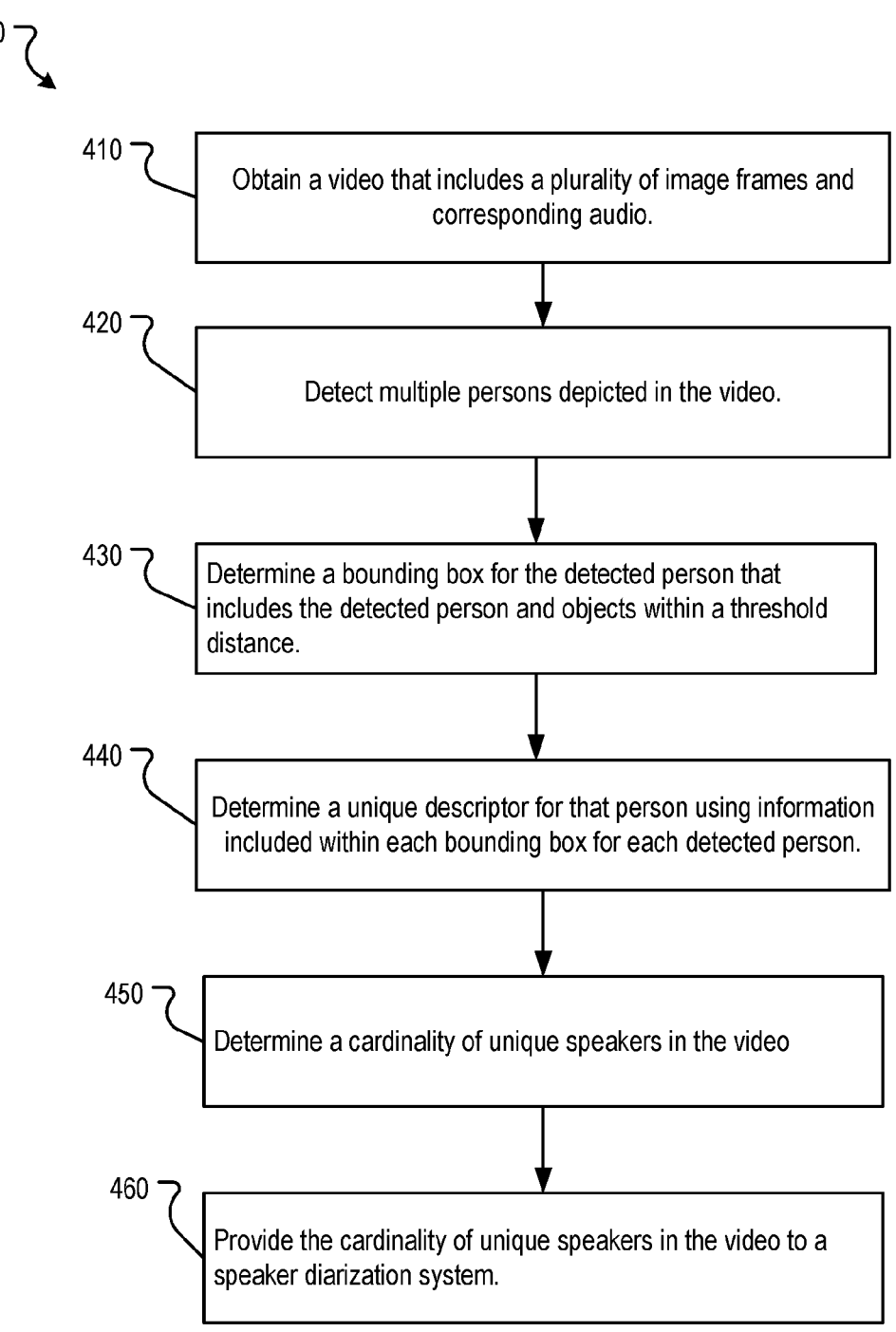

400

410   Obtain a video that includes a plurality of image frames and corresponding audio.

420   Detect multiple persons depicted in the video.

430   Determine a bounding box for the detected person that includes the detected person and objects within a threshold distance.

440   Determine a unique descriptor for that person using information included within each bounding box for each detected person.

450   Determine a cardinality of unique speakers in the video

460   Provide the cardinality of unique speakers in the video to a speaker diarization system.

Fig. 4

CONTEXT-BASED SPEAKER COUNTER FOR A SPEAKER DIARIZATION SYSTEM

CROSS-REFERENCE TO RELATED APPLICATION

This application is a National Stage Application under 35 U.S.C. § 371 and claims the benefit of International Application No. PCT/US2020/022723, filed Mar. 13, 2020, the disclosure of which is incorporated herein by reference.

BACKGROUND

This specification relates to the field of speaker diarization. Speaker diarization is the process of partitioning an audio stream with multiple speakers into segments associated with each individual. Diarization is useful for many applications, such as transcribing audio, captioning, and the like.

The performance and accuracy of current speaker diarization systems relies heavily on determining the number of unique speakers in a video or audio. Some speaker diarization systems rely on heuristics to determine the number of speakers, while others require human input to determine the number of speakers. The latter implementation is susceptible to scale, as human curation requires persons to review audio or video and accurately count speakers. The curators may be unfamiliar with the speakers or may even speak a different languages that the spoken language in the audio or video. The use of heuristics to determine a threshold number of speakers may be more efficient in terms of time and resources, but the diversity of background contexts, especially in video, may result in widely varying counts, resulting in error-prone estimations.

SUMMARY

As more and more audio data now has associated video, the visual context can provide significant information that can be used to generate a prior on the number of unique speakers. In particular, the subject matter of this application relates to using visual context from the video to determine the cardinality of speakers as a prior to provide to the speaker diarization system. This specification describes a novel system and method of providing a speaker diarization system with the cardinality of unique speakers present in a video and a corresponding audio.

In general, one innovative aspect of the subject matter described in this specification can be embodied in methods that include the actions of obtaining a video that includes a plurality of image frames and corresponding audio; detecting, within the video, multiple persons depicted in the video; determining, for each detected person, a bounding box that includes the detected person and objects within a threshold distance of the detected person in the image frame; determining, from image information included within each bounding box for each detected person, a unique descriptor for that person, the unique descriptor based in part on image information depicting the objects within the bounding box; determining a cardinality of unique descriptors determined for the video; providing, to a speaker diarization system that determines unique speakers of the corresponding audio for the video, at least the cardinality of unique descriptors. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The system uses a visual context to determine a person speaking, but the visual context does not personally identify the person speaking. The context is at least the detection of a fact an additional information, such as an area around the face, a detection of a person (e.g., a head and torso), and active speaker detection. The detection of these features results in a process that is more robust that a system that merely relies on active speaker detection without human curation and/or that is based on audio only processing. Accordingly, acceptable accuracy can be achieved without personally identifying persons in a video and without requiring human curation.

More particularly, the visual cues significantly increase robustness of the underlying techniques as opposed to audio only processing. For example, the same person's voice in an indoor environment will sound quite different in an outdoor environment, or more generally when the environments have acoustic properties different from each other. These differences make it very difficult for an audio only processing to accurately determine speaker diarization without using biometric information. However, when taking into account visual features, such as clothing, which changes less often, the process may utilize a pixel based descriptor that may be quite robust to the environmental changes, and need not rely on biometric information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process of determining the cardinality of speakers.

DETAILED DESCRIPTION

Overview

Figure 1A:
FIG. 1A is a block diagram of a context based speaker counting system that determines a prior for a speaker diarization system.
Figure 1A:
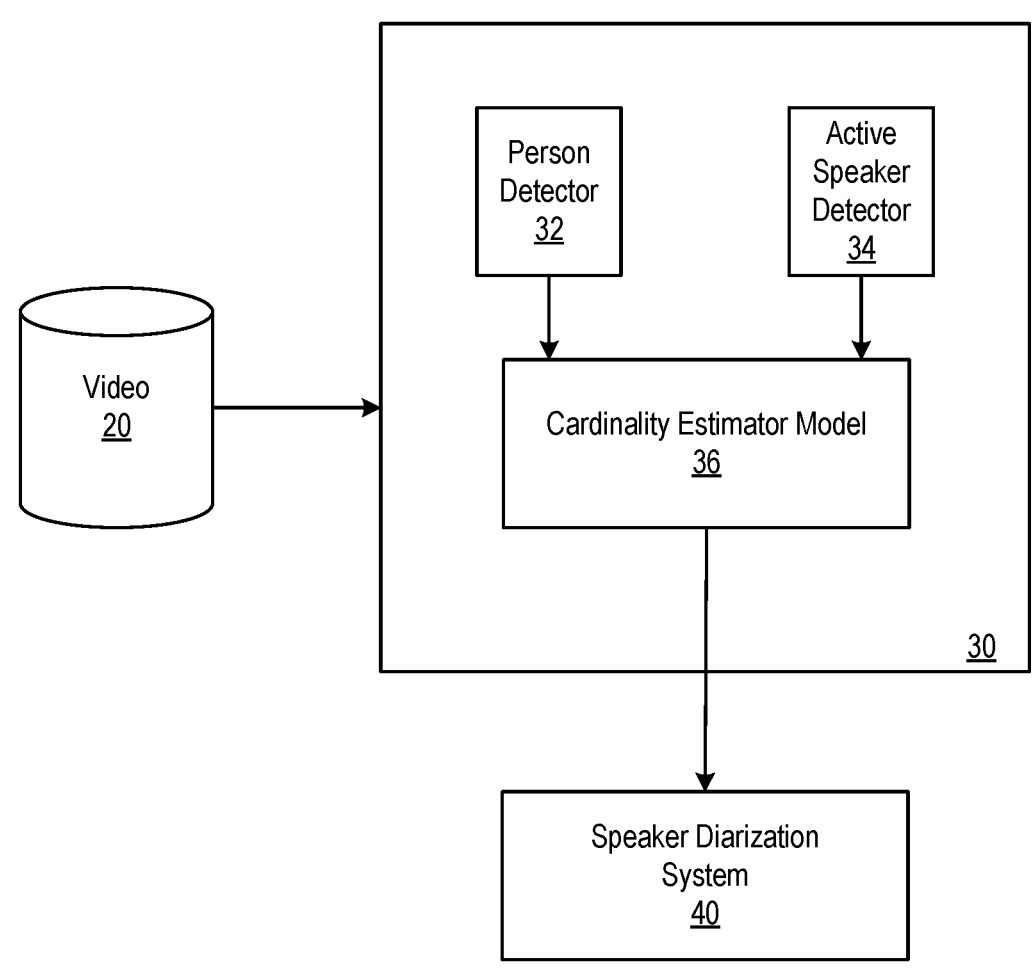

Speaker diarization systems involve a three-step sequence: speech detection, segmentation into single speaker segments, clustering of the single speaker segments. The final step is particularly problematic, where an automated system has to rely on heuristics to determine when to stop clustering, or rely on an external input to provide the number of speakers. As described above, the latter process involves human curation requires persons to process a tremendous amount of data while accurately counting speakers. Other processes may involve using identifying information, e.g., face recognition processes. However, privacy requirements may preclude the use of processes that can be used to identify persons.

The subject matter of this application overcomes the technical problem of accurately estimating a number of speakers in a video without using processes that personally identify the speakers, thus eliminating the use of biometric based data, which gives rise to privacy concerns. The subject matter may use a combination of the following features:

(1) Detection of faces, without any explicit identity associated: For each detected face, the system considers a wider bounding box (a multiple of the face bounding box's dimensions) and use information about the distribution of objects detected in the larger bounding box and consider that a unique descriptor. Thus, the presence of a potential speaker can be detected, but without the use of biometric data.

(2) Detection of persons, without any explicit identity associated: For each detected person, the system uses a histogram of pixel activations as a descriptor, encoding the intuition that such distributions are heavily influenced by local factors such as clothing, illumination, etc., and will stay relatively constant.

(3) Detection of persons with a larger context bounding box: Similar to (1) above, but this time a wider bounding box around the person box is used.

(4) Active speaker detection: The system uses a pre-trained model to detect speaking faces and encode the intuition that a speaker continues speaking for a reasonable duration.

The task of a speaker diarization system is to separate a conversation according to the speakers when the number of speakers in an audio are not known. Since more and more audio content that is generated also has a corresponding video, processing the video as described above can be used predict the cardinality of unique speakers based on the visual context. The speaker diarization system makes use of the count of the number of speakers as a prior when determining the number speakers.

Throughout this document, the term video will refer to video and the corresponding audio of the video where the video comprises a sequence of image frames. Moreover, as used in this document, face detection or person detection does not mean the personal identification of a speaker; instead, these detections only indicate the presence or absence of a human speaker. This can be done without the use of biometric data.

For each video, the speakers in the video are detected using one or more of these signals where each detected speaker is given a unique descriptor determined by the particular signal. Upon determining the unique descriptors using the particular signals, the number of speakers is determined either directly or by providing as input to a machine-learning model and by receiving as output the predicted number of speakers in the video. As used in this specification, a "unique descriptor" is a descriptor (or set of descriptors that are sufficiently similar) determined from the video that indicates the detection of a same person for each instance of the description. The descriptors are not biometric data that are used to personally identify the persons, but instead are derived from the visual features described above. For example, for each frame of video, a descriptor based on the area including a person's head and torso may be generated.

These features and additional features are described in more detail below.

FIG. 1A is a block diagram 10 of a context-based speaker counting system 30 that determines a prior for a speaker diarization system 40. The system 30 receives a video 20 as input. The video 20 includes a plurality of image frames and corresponding audio. A person detector 32 detects, within the video, multiple persons depicted in the video. The person detector 32 may be a process or model that is trained to detect a human face without any explicit identity associated with the face. The detector 32, for each detected face, may also select a bounding box wider than the face (e.g., a multiple of the face bounding box's dimensions) and use information about the distribution of objects detected in the larger bounding box. The detector 32 may also detect a person without any explicit identity associated with the person. For example, for each detected person, the system 30 uses a histogram of pixel activations as a descriptor, and encodes the intuition that such distributions are heavily influenced by local factors such as clothing, illumination, etc., and will stay relatively constant. In still another example, the detector 32 may detect persons with a larger context-bounding box. Thus, as used in this specification, a detected person may be a detected face with additional context as determined by a bounding box, a detection of a person as determined by a bounding box, or a detection of a person with additional context as determined by a bounding box. In other words, for each detected person, the system determines a bounding box that includes the detected person and objects within a threshold distance of the detected person in the image frame.

The cardinality estimator model 36 then determines, from image information included within each bounding box for each detected person, a unique descriptor for that person. The unique descriptor is based in part on image information depicting the objects within the bounding box. For example, the cardinality estimator model 36 determines a histogram of pixel activations as a descriptor.

An active speaker detector 34 may also be used to determine active speakers. The determined active speakers may be matched to the corresponding unique descriptors. For example, lip movement may be detected in a face in a portion of a frame, and the portion of the frame is within a bounding box within which a person is detected. This is used as additional information to determine that the person is an active speaker for at least some portion in the video.

The cardinality estimator model 36 then determines a cardinality of unique descriptors determined for the video. The cardinality is a prediction or estimate of the number of unique speakers in the video. In some implementations, a single cardinality value is determined. In other implementations, the cardinality estimating model can provide a distribution over possible cardinalities of unique speakers to the speaker diarization system. In such implementations, multiple cardinalities of unique descriptors are determined, and for each unique descriptor, the confidence value for that unique descriptor. For example, the system may determine that it is 80% likely that four unique descriptors (e.g., four speakers) are in the video and 20% likely that there are three unique descriptors (e.g., three speakers) in the video. These estimates are then provided to a speaker diarization system 40 that performs speech detection, uses the estimates to determine the number of speakers, and to associate portions of the audio with a corresponding number of speakers.

Figure 1B:
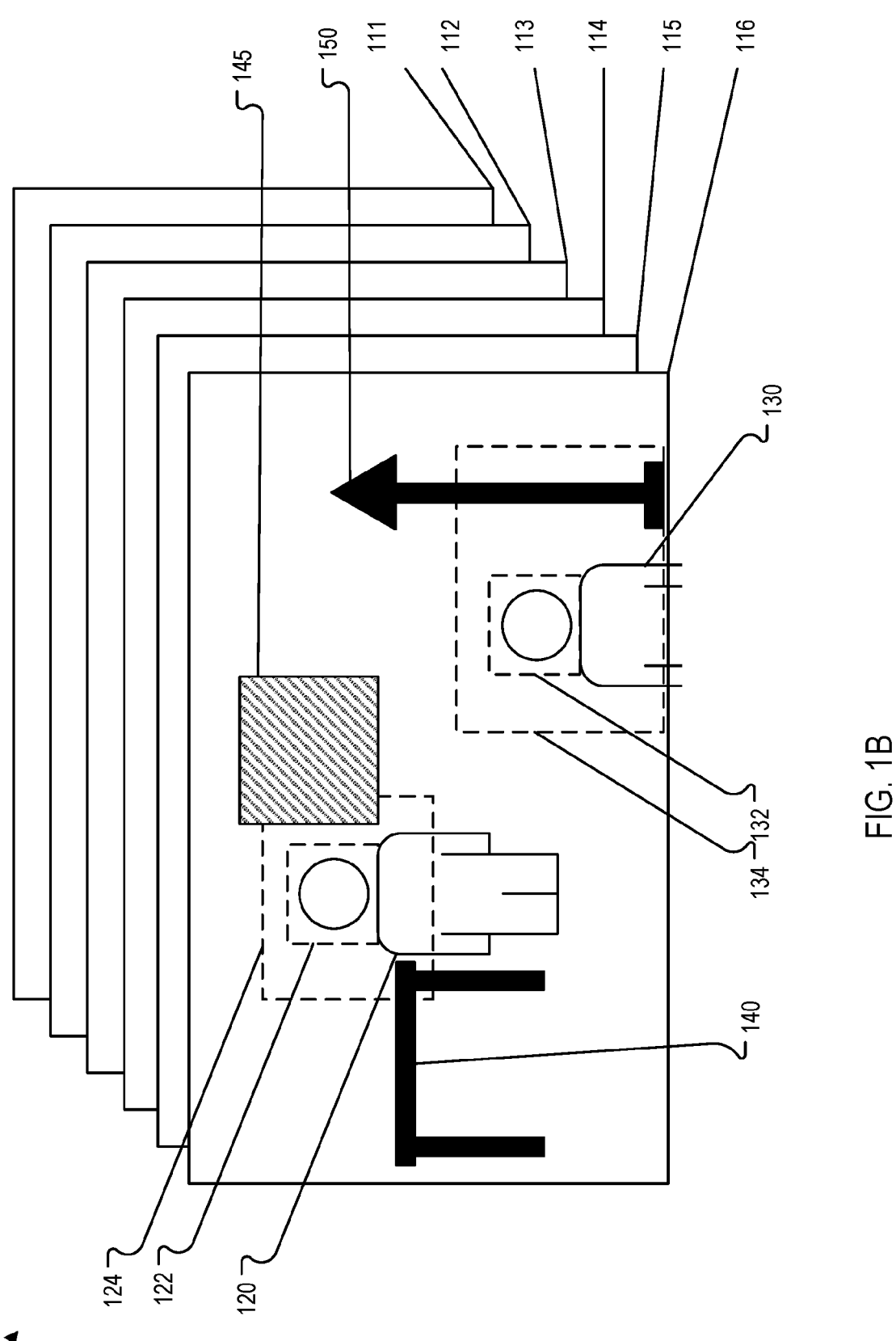
FIG. 1B is a block diagram of an example image frame illustrating wide bounding box.

FIG. 1B is a high-level block diagram of an environment 100 showing an example video 110 comprising multiple image frames 111-116. The video 110 has a corresponding audio signal comprising speech of the speakers present in the video 110. In some implementations, the video 110 can have a single speaker and in other implementations, the video 110 can have multiple speakers. For example, the video 110 shows two human 120 and 130 in image frame 116, each of which are potential speakers.

Not all speakers are shown in the video in each frame. For example, image frame 116 shows two speakers 120 and 130, however image frame 115 may only depict on of the speakers 120 or 130.

In some implementations, the number of speakers in the video is determined by the method of face detection using computer vision or image processing techniques. In such implementations, the sequence of image frames is processed to identify features and determine from the identified features, the detected faces within the video. For example, the speakers 120 and 130 are detected using a face detection technique or person detection technique as described above. For example, the bounding boxes 122 and 132 represent the detected faces and additional context (e.g., each bounding box is larger than the respectively detected face) in the frame 116.

In such implementations, determining the unique descriptor for each speaker is based on objects detected within a threshold distance of the detected face. For example, the face detection technique detects a face within the bounding box 122 to determine the presence of potential speaker 120. Upon detecting the speaker 120, a wider bounding box 124 is used to encapsulate the particular speaker's face and other detectable objects within the wider bounding box 124. In this example, the other detectable objects comprise portions of a table 140 and a window 145.

In some implementations, the threshold distance that determines the maximum separation between the detected face and the detected objects is determined by the designer of the system and can be made available to the system as a user input. In certain implementations, the threshold distance can be determined automatically by the system to capture the uniqueness of the speaker by adjusting the value of the threshold. Such implementations may determine the threshold distance by an iterative process or by a machine-learning model that takes as input the image frame and determines based on the properties of the image frame the threshold. For example, an iterative process may increase or decrease the threshold value on each iteration, and determine the final value of the threshold based on the objects detected within the threshold distance.

In some implementations, the unique descriptor for a particular speaker can be determined using all detectable features within the wider bounding box. In such implementations, techniques like convolution and pooling can be used to identify features and not necessarily a particular object. Continuing with the example, the image frame 116 shows another potential speaker 130. The face detection technique detects the face within the bounding box 132. A wider bounding box 134 is then used to determine a unique descriptor for the potential speaker 130 by encapsulating the face of the speaker 130 and detectable objects within the bounding box 134 that includes portions of the lamp 150.

Figure 2:
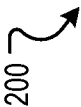
FIG. 2 is a block diagram of an example image frame illustrating larger bounding box.

In some implementations, the potential speakers in the video can be detected using techniques other than face detection. For example, by detecting human physical form or human motion patterns, the presence of a potential speaker can be detected. In such implementations, each speaker in the video and in particular the series of image frames is encapsulated by a larger bounding box that encapsulates the detected human form (e.g., head and torso). Similar to the wider bounding box for the face, for each potential speaker a unique descriptor is determined using objects detected in the larger bounding box. FIG. 2 is an example environment 200 illustrating the larger bounding box surrounding the human form. Upon detecting the potential speaker 220, the larger bounding box 220 is determined to encapsulate the potential speaker 220 and includes other objects like portions of the table 250, portions of the window 230 and the lamp 240. Alternatively, the larger bounding box 220 may be sized to encapsulate primarily the detected human form and omit other objects, as the detected human form may have enough visual features (e.g., clothing, lighting) to distinguish it from other detected human forms that cannot be used for unique personal identification.

In some implementations, the threshold distance that determines the dimensions of the larger bounding box 220 and the maximum separation between the detected potential speaker and the detected objects is determined by the designer of the system and can be made available to the system as a user input. In certain implementations, the threshold that determines the dimensions of the larger bounding box can be determined automatically by the system to capture the uniqueness of the detected speaker by adjusting the value of the threshold. Such implementations may determine the threshold distance by an iterative process or by a machine-learning model that takes as input the image frame and determines based on the properties of the image frame a predicted value of the threshold. Some implementations can include certain measures to allow maximum performance in terms of detecting unique speakers by allowing at least the head and torso of the speaker as a requirement for the larger bounding box. For example, if only the head of the speaker is visible due to the position of the speaker with respect to the image frame then the larger bounding box is inappropriate to generate the unique descriptor for the particular user.

In some implementations, the unique descriptor for each potential speaker in the video is determined using histogram of pixel activations based on the local factors for the corresponding speaker. For example, a speaker wearing a blue shirt sitting on a brown chair in particular lighting conditions in a particular image frame will generate an approximately similar histogram of pixel activations throughout multiple frames of the video and would be different from histograms of pixel activations for other speakers with different local factors. Other implementations may include information obtained from the clothing of the speaker, color and depth analysis of the objects and speakers within the multiple bounding boxes in the image frame.

In some implementations, the histogram of pixel activations generated for all detectable potential speakers can be clustered to from groups of similar histograms. The intuition for doing so is that speakers with their respective local factors will generate similar histograms throughout all the image frames in the video and grouping them into similar clusters will represent unique speakers. In such implementations, the histograms of pixel activations can be generated for speakers based on the portion of the image frame determined by a threshold distance from the detected speaker. In some implementations the threshold may be determined by an iterative process or by a machine learning model that takes as input the image frame and determines based on the properties of the image frame a predicted value of the threshold In some implementations, the unique descriptor of the speakers can be determined upon detecting an active speaker using an active speaker detection system. An active speaker detection system is a system that detects active speaker(s) in a video. For example, for a video that depicts three people conversing, the active speaker detection system can detect which of the three persons is speaking at a given time. The assumption behind this approach is that the visual motion of the mouth during speaking and the corresponding sound generated during speaking are highly correlated. An active speaker detection system can simultaneously process both video and the corresponding audio to keep track of the motion of the speaker mouth even if other features of the speaker's face cannot be detected for some reason. For example, there are two speakers in an audio whereas the corresponding video shows only one speaker. Assume that in the audio, the speaker who is not seen in the video is speaking. In such a scenario, the active speaker detection system can track the movement of the mouth of the speaker who is not speaking and is visible in the video and determine the presence of another speaker.

Figure 3:
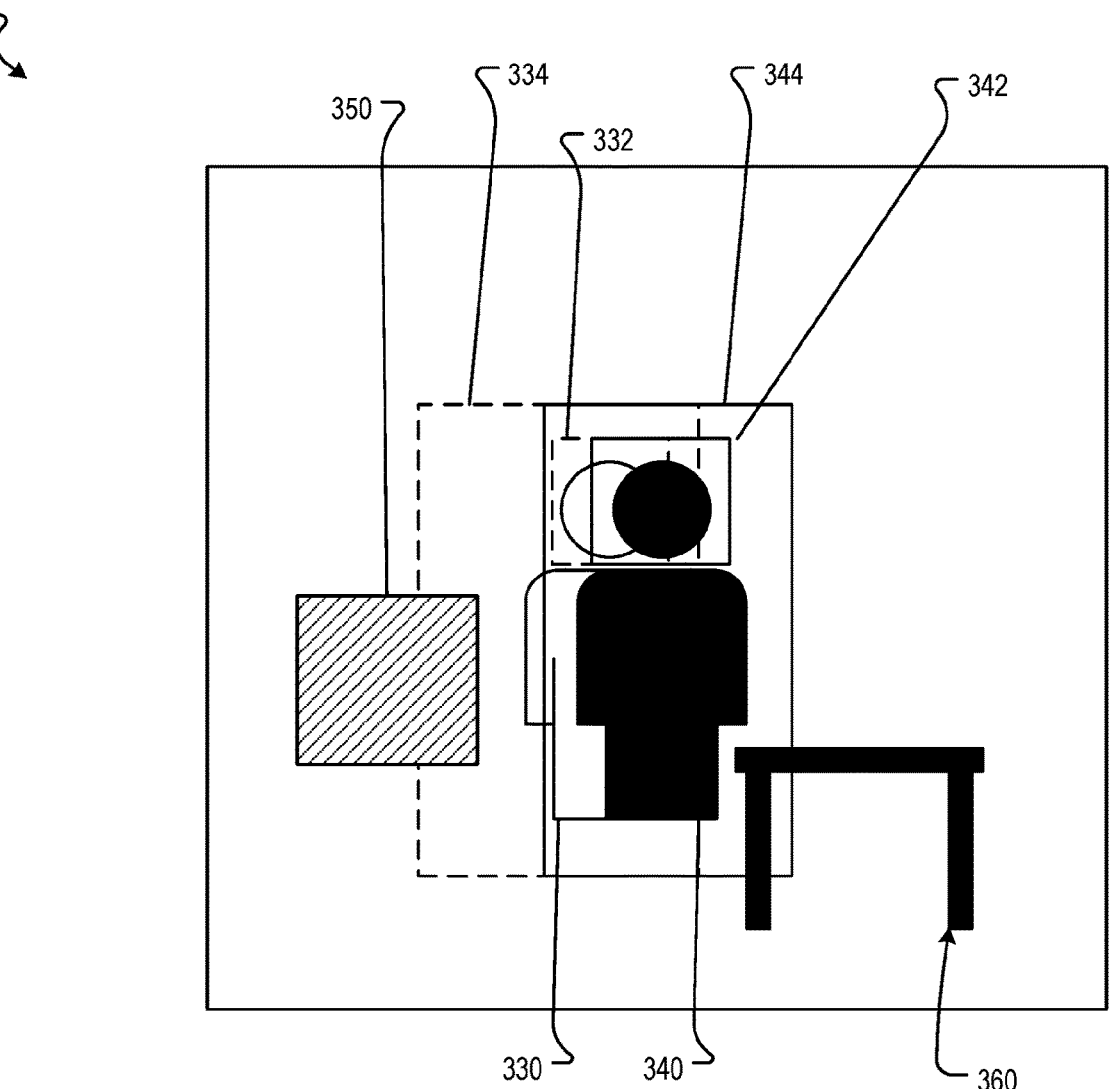
FIG. 3 is a block diagram of an example image frame illustrating the use of multiple video signals simultaneously.

In some implementations, multiple signals can be used to determine unique descriptors for each speaker. An example scenario for such a case is when the position of the multiple speakers detected within an image frame overlaps. FIG. 3 is an example environment 300 that shows an image frame 310. The image frame 320 shows two potential speakers 330 and 340 whose faces have been detected using any face detection technique represented by bounding boxes 332 and 342. The wide bounding box as discussed above for each of the speakers 330 and 340 in this case will result in both the wide bounding boxes to include faces for both the speakers 330 and 340. In such implementations, a larger bounding box for each speaker will capture the uniqueness of two speakers by exploiting the relative positions of objects identified within the larger bounding boxes. For example, the larger bounding box 344 of the speaker 340 includes the bounding box 332 of the speaker 330 that includes the detected face of speaker 330 and other portions of speaker 330 other than the speaker 340. In this example, the unique descriptor for the speaker 330 is determined using information with bounding box 332 and 334 which comprises the detected face of user 330, portion of speaker 340 and the window 350, whereas the unique descriptor for user 340 is determined using detected face of the user 340, portions of user 330 and the table 360.

In some implementations, a cardinality estimating model can be used to determine the number of unique speakers from the unique descriptors. In some implementations, the cardinality estimating model can be a machine-learning model trained to predict the number of unique speakers given the unique descriptors. In other implementations, the cardinality estimating model can be an algorithmic process. For example, one possible implementation is a stepwise elimination process that uses user defined heuristics to eliminate redundant descriptors of each speaker until the cardinality of unique speakers is determined.

In some implementations, the cardinality estimating model can provide a distribution over possible cardinalities of unique speakers to the speaker diarization system. In such implementations, providing the multiple cardinalities of unique descriptors, and for each unique descriptor, the confidence value for that unique descriptor. All of the cardinalities and their confidences can be provided to the speaker diarization system; or, alternatively, only the cardinality with the highest confidence can be provided. For example, the above-described features may be used to train a machine-learning model to predict the cardinality of speakers.

FIG. 4 is the flow diagram of the process 400 for determining the cardinality of unique speakers. The process 400 is implemented in a computer system that includes one or more computers. The process 400 receives a video that includes a plurality of image frames and the corresponding audio (410). The process 400 detects multiple persons in the video (420). For example, for each image frame in the video, potential speakers are detected as described above. Other methods of detecting speakers include tracking human motion patterns and human physical form. In some cases, an active speaker detection system (e.g., lip movement) can also be used to detect the presence of speakers in the video.

After detecting the potential speakers in the image frames, the process 400 determines the bounding boxes for encapsulating the speaker and the objects within a threshold distance (430). In some scenarios for each detected face in an image frame, a wider bounding box is determined based on the threshold distance that includes the particular speaker's face and the objects within the wider bounding box. For example, upon detecting speaker 120 and 130, wider bounding boxes 124 and 134 are determined based on a threshold distance from the detected face of speaker 120 and 130. In other scenarios, upon identifying the speakers in an image frame a larger bounding box is determined to encapsulate each particular speaker and the objects within a threshold distance. For example, upon identifying speaker 220, a larger bounding box 260 is determined to encapsulate the speaker and the objects within a threshold distance.

Upon determining the bounding boxes for the detected speakers in the image frames, the process 400 generates a unique descriptor is generated for each detected speakers (440). For example, upon determining the wider bounding box 124 determined by a threshold distance, objects like portion of the table 140 and portion of the window 145 are detected within the wider bounding box. A unique descriptor is then generated for the speaker 120 based on the detected face 122 and the objects 140 and 145. In another example, the unique descriptor is generated based on the speaker and the detected objects with the larger bounding box 260 that includes the table 250, the window 230 and the lamp 240. Upon generating the unique descriptors for each detected speaker in the video, the process 400 determines the cardinality of unique speakers in the video (450). For example, the unique descriptors can be provided to a cardinality estimating model to predict from the unique descriptors the cardinality of unique speakers in the video. Upon determining the cardinality of the unique speakers, the process 400 provides the cardinality to the speaker diarization system (460). In some implementations, the multiple cardinality of unique speakers in the video can be determined. In such implementations, all determined cardinalities are provided to the speaker diarization system with a distribution over the determined cardinalities or the in some cases the cardinality with the highest confidence is provided.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

obtaining a video that includes a plurality of image frames and corresponding audio;

detecting, within the video, multiple persons speaking depicted in the video without using biometric information to identify the persons speaking, the detection of each person based on the face of the person speaking detected in a face detection bounding box;

in response to detecting the multiple persons speaking depicted in the video, determining, for each detected person, a bounding box that includes the detected person and objects within a threshold distance of the detected person in the image frame, the bounding box larger than the face detection bounding box and including the face detection bounding box;

determining, for each detected person, from image information included within the bounding box for the detected person and without using biometric data that identifies the detected person, a unique descriptor for that person, the unique descriptor based in part on image information depicting the objects within the bounding box, each unique descriptor for the detected person not including biometric data that identifies the person, including determining a histogram of pixel activations for each of multiple frames, the histogram of pixel activations determined from local factors from the image information included within the bounding box;

determining a cardinality of unique descriptors determined for the video, including:

generating histogram clusters of the histograms, wherein each histogram cluster includes only histogram that are within a threshold distance of each other; and determining the cardinality of unique descriptors as the number of histogram clusters;

providing, to a speaker diarization system that determines unique speakers of the corresponding audio for the video, at least the cardinality of unique descriptors.

2. The method of claim 1, wherein:

detecting, within the video, multiple persons depicted in the video, comprises detecting faces within the video; and determining, for each detected person, a bounding box that includes the detected person and objects within a threshold distance of the detected person in the image frame comprises determining a bounding box that is a multiple of a face detection bounding box that is inclusive of a minimum portion of the image frame required to detect the face of the detected person.

3. The method of claim 1, wherein:

detecting, within the video, multiple persons depicted in the video, comprises detecting a body that includes detecting the position of a head and torso of each person; and determining, for each detected person, a bounding box that includes the detected person and objects within a threshold distance of the detected person in the image frame comprises determining a bounding box that is a multiple of a body detection bounding box that is inclusive of a minimum portion of the image frame required to detect the at least head and torso of the detected person.

4. The method of claim 1, wherein determining a cardinality of unique descriptors comprises:

providing, to a cardinality estimating model, the unique descriptors; and receiving, from the cardinality estimating model, an estimate of the cardinality unique descriptors.

5. The method of claim 1, wherein determining a cardinality of unique descriptors determined for the video comprises:

determining multiple cardinalities of unique descriptors; and for each cardinality of the multiple cardinalities, determining a confidence value that is indicative of a confidence that the cardinality is correct.

6. The method of claim 1, wherein providing, to a speaker diarization system that determines unique speakers of the corresponding audio for the video, at least the cardinality of unique descriptors comprises providing the multiple cardinalities of unique descriptors, and for each unique descriptor, a confidence value for that unique descriptor.

7. The method of claim 1, wherein providing, to a speaker diarization system that determines unique speakers of the corresponding audio for the video, at least the cardinality of unique descriptors comprises providing cardinality of unique descriptors that has a highest confidence value relative to the confidence values of all other unique descriptors.

8. A system, comprising:

a data processing apparatus; and a non-transitory computer readable medium storing instructions executable by the data processing apparatus and that upon such execution cause the data processing apparatus to perform operations comprising:

obtaining a video that includes a plurality of image frames and corresponding audio;

detecting, within the video, multiple persons speaking depicted in the video without using biometric information to identify the persons speaking, the detection of each person based on face of the person speaking detected in a face detection bounding box;

in response to detecting the multiple persons speaking depicted in the video, determining, for each detected person, a bounding box that includes the detected person and objects within a threshold distance of the detected person in the image frame, the bounding box larger than the face detection bounding box and including the face detection bounding box;

determining, for each detected person, from image information included within the bounding box for the detected person and without using biometric data that identifies the detected person, a unique descriptor for that person, the unique descriptor based in part on image information depicting the objects within the bounding box, each unique descriptor for the detected person not including biometric data that identifies the person, including determining a histogram of pixel activations for each of multiple frames, the histogram of pixel activations determined from local factors from the image information included within the bounding box;

determining a cardinality of unique descriptors determined for the video, including:

generating histogram clusters of the histograms, wherein each histogram cluster includes only histogram that are within a threshold distance of each other; and determining the cardinality of unique descriptors as the number of histogram clusters;

providing, to a speaker diarization system that determines unique speakers of the corresponding audio for the video, at least the cardinality of unique descriptors.

9. The system of claim 8, wherein:

detecting, within the video, multiple persons depicted in the video, comprises detecting faces within the video; and determining, for each detected person, a bounding box that includes the detected person and objects within a threshold distance of the detected person in the image frame comprises determining a bounding box that is a multiple of a face detection bounding box that is inclusive of a minimum portion of the image frame required to detect the face of the detected person.

10. The system of claim 8, wherein:

detecting, within the video, multiple persons depicted in the video, comprises detecting a body that includes detecting the position of a head and torso of each person; and determining, for each detected person, a bounding box that includes the detected person and objects within a threshold distance of the detected person in the image frame comprises determining a bounding box that is a multiple of a body detection bounding box that is inclusive of a minimum portion of the image frame required to detect the at least head and torso of the detected person.

11. The system of claim 8, wherein determining a cardinality of unique descriptors comprises:

providing, to a cardinality estimating model, the unique descriptors; and receiving, from the cardinality estimating model, an estimate of the cardinality unique descriptors.

12. The system of claim 8, wherein determining a cardinality of unique descriptors determined for the video comprises:

determining multiple cardinalities of unique descriptors; and for each cardinality of the multiple cardinalities, determining a confidence value that is indicative of a confidence that the cardinality is correct.

13. The system of claim 8, wherein providing, to a speaker diarization system that determines unique speakers of the corresponding audio for the video, at least the cardinality of unique descriptors comprises providing the multiple cardinalities of unique descriptors, and for each unique descriptor, a confidence value for that unique descriptor.

14. The system of claim 8, wherein providing, to a speaker diarization system that determines unique speakers of the corresponding audio for the video, at least the cardinality of unique descriptors comprises providing cardinality of unique descriptors that has a highest confidence value relative to the confidence values of all other unique descriptors.

15. The system of claim 8, wherein the speaker diarization system performs speech detection, uses the cardinality of unique to determine the number of speakers, and associates portions of the audio with a corresponding cardinality of speakers.

16. A non-transitory computer readable medium storing instructions executable by a data processing apparatus and that upon such execution cause the data processing apparatus to perform operations comprising:

obtaining a video that includes a plurality of image frames and corresponding audio;

obtaining a video that includes a plurality of image frames and corresponding audio;

detecting, within the video, multiple persons speaking depicted in the video without using biometric information to identify the persons speaking, the detection of each person based on face of the person speaking detected in a face detection bounding box;

in response to detecting the multiple persons speaking depicted in the video, determining, for each detected person, a bounding box that includes the detected person and objects within a threshold distance of the detected person in the image frame, the bounding box larger than the face detection bounding box and including the face detection bounding box;

determining, for each detected person, from image information included within the bounding box for the detected person and without using biometric data that identifies the detected person, a unique descriptor for that person, the unique descriptor based in part on image information depicting the objects within the bounding box, each unique descriptor for the detected person not including biometric data that identifies the person, including determining a histogram of pixel activations for each of multiple frames, the histogram of pixel activations determined from local factors from the image information included within the bounding box;

determining a cardinality of unique descriptors determined for the video, including:

generating histogram clusters of the histograms, wherein each histogram cluster includes only histogram that are within a threshold distance of each other; and determining the cardinality of unique descriptors as the number of histogram clusters;

providing, to a speaker diarization system that determines unique speakers of the corresponding audio for the video, at least the cardinality of unique descriptors.

\* \* \* \* \*